Patented Jan. 17, 1939

2,144,115

UNITED STATES PATENT OFFICE 2,144,115

PIGMENT PURIFICATION

Eugene Merz, Florham Park, N. J., assignor to The Calco Chemical Company, Inc., Bound Brook, N. J., a corporation of Delaware No Drawing. Application February 1, 1932, Serial No. 590,329

15 Claims. (Cl. 209—166)

The present invention relates to a method of purifying and separating pigments from their contained dirt, coal dust or other impurities and to the pigment thus purified.

In the course of manufacture of pigments, impurities are picked up at some point in the production and these impurities not only cause a dulling or modification of the true color thereof, but cause difficulty in the application of the pigment in the arts.

It is, therefore, the principal object of the invention to treat such impure pigments as to cause an efficient separation therefrom of their contained dirt and other impurities, which treatment at the same time will not impair the quality of the material being treated.

As an illustration of such pigments, ultramarine may be mentioned. This material during the course of its manufacture and subsequent treatment in preparing the same for actual use has been found to be contaminated with carbon and/or sulphur and/or other impurities. These impurities have the effect of modifying the true color of the pigment, which thereby impairs its usefulness. Many attempts have been made to cause the separation of the undesirable matter from ultramarine, but these previous attempts have been unsuccessful either from the standpoint of the separation or from the standpoint that the separation treatment affects the quality of the pigment deleteriously.

It has been discovered that pigments of which ultramarine is a type, may be efficiently purified and separated from their impurities and dirt by subjecting a pulp thereof to a flotation operation in the presence of a flotation reagent or reagents having a selective affinity or attraction for the impurities.

This invention, therefore, consists broadly in causing a separation of pigments from their contained dirt or impurities by means of a flotation operation conducted in the presence of a flotation reagent having a differential affinity for either the pigment or the dirt, as the case may be and to the pigment thus purified.

In the treatment of ultramarine as an example, to separate the same from its impurities, which may consist of carbon and/or sulphur and/or other dirt, a flotation operation has resulted in successful purification where the flotation reagent consists of either cresylic acid, coal tar or wood creosotes, kerosene or other petroleum distillates, pine oil, or mixtures thereof.

As an illustration of ultramarine purification by such methods, a pulp was made thereof in which the solids ran substantially from 5.5 to 11%. This pulp was then transferred to a sub-aerated mechanically agitated type of flotation machine and subjected therein to a float in the presence of varying proportions of cresylic acid, creosote and kerosene, and mixtures thereof.

Such treatment was effective in removing as high as 8% by weight of the impurities as a concentrate, which concentrate represents practically 100% of the contained so-called dirt.

An efficient combination of reagents appears to be a mixture of the following materials used in substantially the proportions specified, calculated on the dry basis of the ultramarine treated.

| | Lbs. per ton |
|---|---|
| Coal tar creosote | 1.80 |
| Cresylic acid | .88 |
| Kerosene | .19 |

The reagents may be added as a single addition or staged as continuous or intermittent additions over the entire flotation period.

The flotation period may run substantially from 19 to 25 minutes, although obviously the flotation period may be either shortened or lengthened until a desired end point has been reached.

Another efficient combination of reagents for the separation of dirt or impurities of ultramarine consisted of 0.73 grams of a mixture containing 50 parts by volume of coal tar creosote, 15 parts by volume of steam distilled pine oil, 25 parts by volume of cresylic acid and 10 parts by volume of kerosene. In addition to the above mixture there was added 0.29 grams of naphtha and 0.41 grams of cresylic acid. The pulp treated consisted of 1620 grams of ultramarine in 3780 grams of water. In this example, the three reagents were used in amounts equivalent to 0.90, 0.36 and 0.50 pounds per ton of dried ultramarine, respectively. In this float, the total time of agitation and flotation was 25 minutes, during which period 54 grams of concentrate or impurities were removed. This is equivalent to a weight loss of 3.3%. An examination of the cleaned product, that is, the tailings, showed that a remarkable improvement had been made as a result of the removal of this impurity.

Another combination of reagents found efficient for the treatment of a particular type of ultramarine contained substantially the volumetric proportions as specified.

| | Cubic centimeters |
|---|---|
| Coal tar creosote | 600 |
| Steam distilled pine oil | 120 |
| Cresylic acid | 780 |
| Kerosene | 300 |

3.45 pounds of this mixture was used to treat approximately 4,000 pounds of ultramarine.

Still another combination which proved effective for the treatment of ultramarine contained substantially the volumetric proportions as specified.

| | Cubic centimeters |
|---|---|
| Coal tar creosote | 1,100 |
| Steam distilled pine oil | 30 |
| Cresylic acid | 70 |

This combination was used in substantially the proportion of from 0.60 to 1.25 pounds per ton of dry ultramarine.

Furthermore, it was found that the following reagents were useful for the treatment of ultramarine used in substantially the following amounts.

| | Lbs. per ton |
|---|---|
| Coal tar creosote | 0.69 |
| Steam distilled pine oil | 0.02 |
| Cresylic acid | 0.04 |
| Hardwood creosote | 0.70 |

When used in the proportions of 0.60 to 1.25 pounds of this reagent combination per ton of dry ultramarine, the best results were secured.

The above reagents or reagent combinations may be added as a single addition or staged as continuous or intermittent additions over the entire flotation period.

The flotation period may run substantially from 19 to 25 minutes, although obviously the flotation period may be either shortened or lengthened until a desired end point has been reached.

Success has been attained with pulps containing from 5% to 48% solids.

It has also been found that certain pigments, especially ultramarine, differ in their frothing characteristics. The use of addition agents prior to the addition of the flotation reagents has produced clearer and more desirable froths. As for example the addition of 10 pounds of soda ash and 2 pounds of sulphuric acid per ton of dry ultramarine before adding the following reagents:

| | Lbs. per ton |
|---|---|
| Kerosene | .77 |
| Coal tar creosote | .19 |
| Steam distilled pine oil | .06 |
| Cresylic acid | .10 | produced a more desirable froth for the treatment of this particular type of ultramarine. Without these addition reagents the froth was voluminous and undesirable. The grade of this treated ultramarine was also better than that obtained without the addition reagents.

In all of the above cases, comparison of the pigment tailings with the untreated material showed a remarkable improvement in color and quality.

Although this particular example shows that good results were obtained with a mixture of these two addition reagents, this invention is not limited to the use of these two regulating reagents which may be used separately or together but will include such reagents as starch, sodium sulphate and sodium silicate. The amounts of these regulating reagents used is obviously dependent upon the characteristics of the particular pigment or ultramarine to be treated and is not limited to any specified quantities.

While the invention has been described above as having particular reference to ultramarine and a treatment for separating therefrom certain types of dirt, yet obviously the invention is not to be limited thereto but on the contrary contemplates the treatment of any natural or artificial pigment which contains substances deleterious to their use in the arts. These deleterious substances may be concomitants of the process of manufacture resulting from incomplete or improper reaction, contamination contained in the raw materials used in the manufacture, or extraneous material introduced during the process of manufacture. These substances, called dirt or impurities herein, may cause not only a dulling or modification of the true color of the pigment, but may cause also difficulty in the application or use of the pigment in the arts.

The treatment contemplated by this invention is not necessarily limited to the complete removal of such impurities for in many cases it will be found satisfactory to remove only sufficient quantities thereof to produce an improved quality or usefulness in the pigment.

I claim:

1. A method for purifying ultramarine containing floatable dirt which consists in making a pulp thereof and subjecting the same to a flotation operation in the presence of a flotation reagent having a selective affinity for said dirt.

2. A method of purifying ultramarine from its contained dirt including carbon and sulphur, which consists in making a pulp thereof and subjecting the same to a flotation operation in the presence of a flotation reagent having a selective affinity for said dirt.

3. A method of purifying ultramarine from its contained dirt including carbon and sulphur, which consists in making a pulp thereof containing substantially from 5 to 48% solids and subjecting the same to a flotation operation in the presence of a flotation reagent having a selective affinity for said dirt.

4. A method of separating ultramarine from contained impurities including carbon and sulphur, which consists in making a pulp thereof, and subjecting the same to a flotation operation in the presence of cresylic acid.

5. A method of separating ultramarine from contained impurities including carbon and sulphur, which consists in making a pulp thereof, and subjecting the same to a flotation operation in the presence of cresylic acid and creosote.

6. A method of separating ultramarine from contained impurities including carbon and sulphur, which consists in making a pulp thereof, and subjecting the same to a flotation operation in the presence of cresylic acid, creosote and kerosene.

7. A method of separating ultramarine from contained impurities including carbon and sulphur, which consists in making a pulp thereof, and subjecting the same to a flotation operation in the presence of cresylic acid, creosote, kerosene and pine oil.

8. A method of separating ultramarine from impurities including carbon and sulphur, which consists in making a pulp thereof containing substantially 5.0 to 48% solids, and subjecting the same to a flotation operation in the presence of cresylic acid.

9. A method of separating ultramarine from impurities including carbon and sulphur, which consists in making a pulp thereof containing substantially 5.0 to 48% solids, and subjecting the same to a flotation operation in the presence of cresylic acid and creosote.

10. A method of separating ultramarine from impurities including carbon and sulphur, which consists in making a pulp thereof containing substantially 5.0 to 48% solids, and subjecting the same to a flotation operation in the presence of cresylic acid, creosote and kerosene.

11. A method of separating ultramarine from impurities including carbon and sulphur, which consists in making a pulp thereof containing substantially 5.0 to 48% solids, and subjecting the same to a flotation operation in the presence of cresylic acid, creosote, kerosene and pine oil.

12. A method of separating ultramarine from impurities consisting of carbon and sulphur, which consists in making a pulp thereof and subjecting the same to a flotation operation in the presence of the following reagents in substantially the proportions specified:

| | Lbs. per ton |
|---|---|
| Creosote | 1.80 |
| Cresylic acid | .88 |
| Kerosene | .19 |

13. A method of separating ultramarine from contained impurities including carbon and sulphur, which consists in making a pulp thereof, and subjecting the same to the action of a dispersing agent, and then to a flotation operation in the presence of cresylic acid.

14. A method of separating ultramarine from contained impurities including carbon and sulphur, which consists in making a pulp thereof, and subjecting the same to the action of soda ash and sulphuric acid, and then to a flotation operation in the presence of cresylic acid.

15. A method of separating ultramarine from contained impurities including carbon and sulphur, which consists in making a pulp thereof, and subjecting the same to the action of about 10 pounds of soda ash and 2 pounds of sulphuric acid per ton of dry ultramarine, and then to a flotation operation in the presence of cresylic acid.

EUGENE MERZ.